J. DUFFY.
MOTOR CYCLE FRAME.
APPLICATION FILED NOV. 14, 1917.
1,278,122.
Patented Sept. 10, 1918.
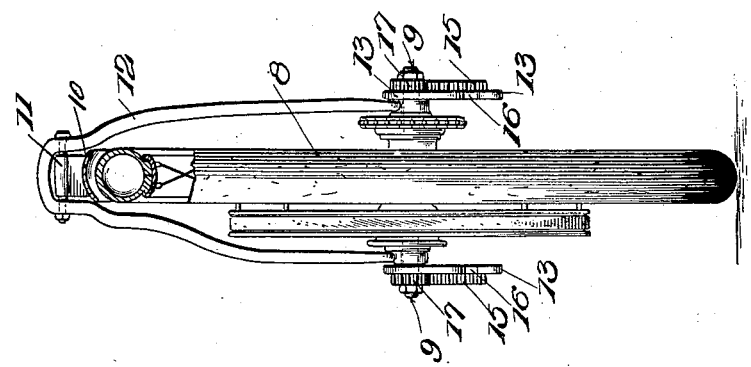
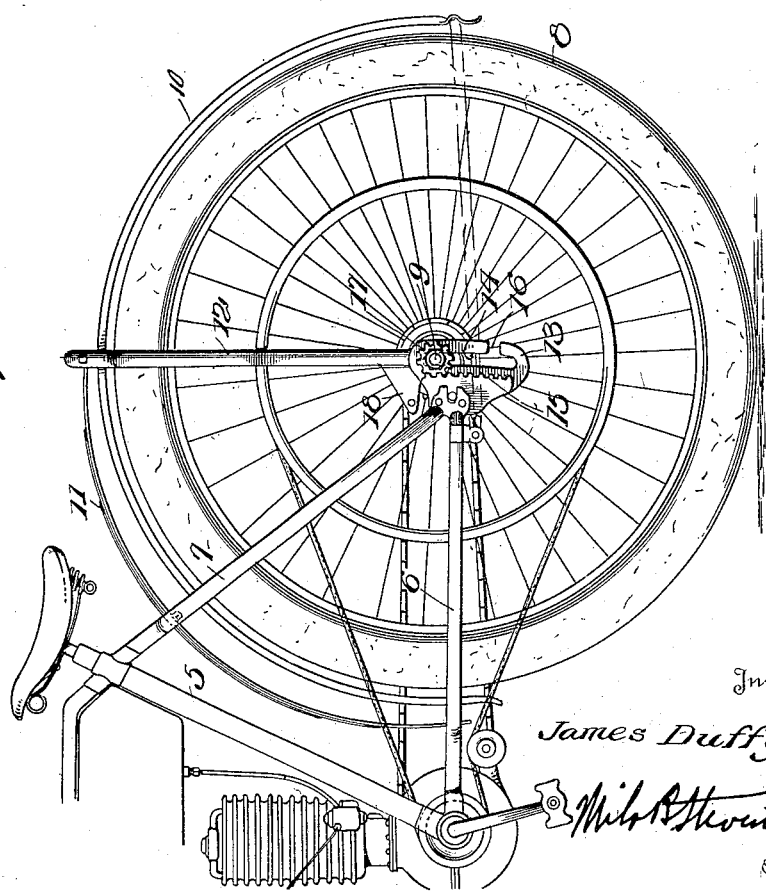

UNITED STATES PATENT OFFICE.

JAMES DUFFY, OF CHICAGO, ILLINOIS.

MOTOR-CYCLE FRAME.

1,278,122.   Specification of Letters Patent.   Patented Sept. 10, 1918.

Application filed November 14, 1917. Serial No. 201,938.

*To all whom it may concern:*

Be it known that I, JAMES DUFFY, a citizen of the United States, residing at Chicago, in the county of Cook and State of Illinois, have invented new and useful Improvements in Motor-Cycle Frames, of which the following is a specification.

This invention relates more particularly to the rear portion of motorcycle frames, the object being to provide a novel and improved spring suspension for the rear wheel by which side bumps or lateral shocks are absorbed on both sides and equalized, thereby preventing distortion of the frame.

The object stated is attained by means of a combination and arrangement of parts to be hereinafter described and claimed, and in order that the same may be better understood, reference is had to the accompanying drawing forming a part of this specification.

In the drawing,

Figure 1 is a side elevation showing the application of the invention, and

Fig. 2 is an end view thereof partly in section.

Referring specifically to the drawing, 5 denotes the seat post of the frame of a motorcycle from which extends a rear bottom fork 6. A brace fork 7 extends diagonally between the upper end of the post 5 and the outer or rear end of the fork 6. These parts represent the rear portion of a typical motorcycle frame. The rear wheel is shown at 8 and its axle at 9.

On the outside of the usual rear mudguard 10 is mounted a curved leaf spring 11, the same seating between the branches of the fork 7 and being fastened intermediate its ends to said fork. One end of this spring terminates at a point above the center of the wheel 8 where it carries a depending fork 12 straddling said wheel. The lower ends of the branches of the fork 12 carry the axle 9, and at the ends of the latter are plates 13 in each of which is a vertical slot 14, said plates being riveted or otherwise fastened to the rear meeting ends of the forks 6 and 7. On the outer faces of the plates 13 are raised portions which are formed with rack teeth 15, these racks extending parallel to the slots 14. It will be noted that the slots and adjacent racks are slightly curved in the direction of their length. In the rear edge of the plates 13 are slots or openings 16 which lead to the slots 14 to enable the axle 9 to be inserted into the latter, it fitting loosely in said slots so that it is free to slide up and down therein, the curvature of the slots conforming to the arc in which the wheel swings with the vertical movement of the axle in the slots. The wheels therefore swing without causing the drive chain to bind. Accidental exit of the axle through the slots 16 is not likely, as the axle is nearly always above the same in the upper portion of the slots 14, and rearward slippage is prevented by the drive belt or chain.

On the axle 9 are fixed pinions 17 which are in mesh, respectively, with the racks 15. It will be seen that any upward or diagonal shock received by the wheel 8 will be transmitted evenly to the spring 11, through the fork 12, on account of the equal travel of the pinions on the respective racks. The mounting of one pinion on its rack causes a parallel action at the other side of the wheel, and hence whichever side the shock is received, the wheel ascends in a vertical line, transmitting the impulse evenly to the frame.

In order that a coaster brake may be used, one of the branches of the fork 12 has a projecting arm 18 for attachment of the coaster brake arm. Ordinarily, this arm is attached to the fork 6 but the vertical movable rear wheel 8 in the present instance will not permit this attachment.

I claim:—

1. The combination with the rear portion of a cycle frame, and the rear wheel and its axle; of a suspension spring carried by said frame, a depending fork carried by the spring and supporting the axle, plates carried by the frame, and provided with vertical slots and racks along the latter, in which slots the aforesaid axle is slidably mounted, and pinions carried by the axle and meshing with the racks.

2. The combination with the rear portion of a cycle frame, and the rear wheel and its axle; of a suspension spring carried by said frame, a depending fork carried by the spring and supporting the axle, plates carried by the frame and provided with vertical slots and racks along the latter, in which slots the aforesaid axle is slidably mounted, said slotted portions of the plates having rear openings leading to the slots, and pinions carried by the axle and meshing with the racks.

In testimony whereof I affix my signature.

JAMES DUFFY.